United States Patent
Cayment et al.

(10) Patent No.: US 10,015,450 B2
(45) Date of Patent: Jul. 3, 2018

(54) METHOD FOR CHECKING THE PLAY BETWEEN STRIPS DEPOSITED BY A DRAPE-FORMING HEAD, AND SUB-ASSEMBLY OF A DRAPE-FORMING HEAD WITH AN ONBOARD CHECKING DEVICE

(75) Inventors: Michel Robert José Cayment, Bretenoux (FR); Philippe Claude Marques, Capdenac-Gare (FR)

(73) Assignee: FIVES MACHINING (FR)

( * ) Notice: Subject to any disclaimer, the term of this patent is extended or adjusted under 35 U.S.C. 154(b) by 379 days.

(21) Appl. No.: 14/112,162

(22) PCT Filed: May 3, 2012

(86) PCT No.: PCT/FR2012/050990
§ 371 (c)(1),
(2), (4) Date: Oct. 16, 2013

(87) PCT Pub. No.: WO2012/164184
PCT Pub. Date: Dec. 6, 2012

(65) Prior Publication Data
US 2014/0028831 A1   Jan. 30, 2014

(30) Foreign Application Priority Data

May 31, 2011 (FR) .................................. 11 54774
Jun. 15, 2011 (FR) .................................. 11 55228

(51) Int. Cl.
*H04N 9/47* (2006.01)
*H04N 7/18* (2006.01)
(Continued)

(52) U.S. Cl.
CPC ........... *H04N 7/183* (2013.01); *B29C 70/386* (2013.01); *B29C 70/388* (2013.01)

(58) Field of Classification Search
CPC ........................... B29C 70/386; B29C 70/388
See application file for complete search history.

(56) References Cited

U.S. PATENT DOCUMENTS

| 4,842,684 A | 6/1989 | Tillement et al. ............ 156/538 |
| 5,120,976 A * | 6/1992 | Clayton ............... G01B 11/028 250/559.07 |

(Continued)

FOREIGN PATENT DOCUMENTS

| FR | 2 888 156 | 1/2007 |
| FR | 2 894 510 | 6/2007 |

(Continued)

OTHER PUBLICATIONS

International Search Report and Written Opinion dated Jul. 23, 2012 issued in corresponding International patent application No. PCT/FR2012/050990.

*Primary Examiner* — Rebecca Volentine
(74) *Attorney, Agent, or Firm* — Ostrolenk Faber LLP

(57) ABSTRACT

The present disclosure relates to a sub-assembly of a drape-forming head (20), comprising, downstream, at least one member (23) for depositing the prepreg strip, at least one roller (30, 30') for compacting the prepreg strip, and a device (10) for checking the play between the strips, consisting of a profilometer including a camera (13), a laser light source (11) projecting a line of light onto the surface to be checked, and a prism (16) arranged near the surface to be checked, in the axis of the camera (13), so as to send, to the camera (13), the image of the projected line of light that reaches the camera at a certain angle. The camera (13) and the light source (11) are placed side-by-side in an offset housing (18) arranged remotely from the compacting rollers (30, 30'), the prism (16) being connected to the housing (18) and to the (Continued)

camera (13) via an elongate casing (19) vertically arranged between the compacting rollers (30, 30').

5 Claims, 4 Drawing Sheets

(51) Int. Cl.
*B29C 65/00* (2006.01)
*B29C 65/02* (2006.01)
*B32B 37/00* (2006.01)
*B32B 38/00* (2006.01)
*B29C 70/38* (2006.01)

(56) References Cited

U.S. PATENT DOCUMENTS

| | | | | |
|---|---|---|---|---|
| 5,562,788 A * | 10/1996 | Kitson | ............. | B29C 70/384 156/378 |
| 5,978,090 A * | 11/1999 | Burri | ............. | G01N 21/88 356/613 |
| 6,307,210 B1 * | 10/2001 | Suzuki | ............. | G01N 21/88 250/559.08 |
| 6,560,248 B1 * | 5/2003 | Vernackt | ............. | G03F 7/2032 250/234 |
| 6,621,060 B1 | 9/2003 | Nantel et al. | ............. | 250/201.4 |
| 7,423,734 B1 | 9/2008 | Luik | ............. | 356/3.01 |
| 8,345,269 B2 * | 1/2013 | Anderson | ............. | G01B 11/046 250/559.24 |
| 2003/0033895 A1 * | 2/2003 | Kitamura | ............. | B25J 11/00 73/865.8 |
| 2005/0061422 A1 * | 3/2005 | Martin | ............. | B29C 70/388 156/230 |
| 2007/0223802 A1 * | 9/2007 | Tateda | ............. | B29C 70/54 382/141 |
| 2007/0229805 A1 | 10/2007 | Engelbart et al. | | |
| 2007/0271064 A1 | 11/2007 | Walton | | |
| 2007/0277919 A1 * | 12/2007 | Savol | ............. | B29C 70/386 156/64 |
| 2007/0280501 A1 * | 12/2007 | Walton | ............. | G01N 21/8806 382/100 |
| 2008/0259325 A1 * | 10/2008 | Engelbart | ............. | B29C 70/32 356/237.3 |
| 2009/0059195 A1 * | 3/2009 | Sato | ............. | G03F 7/2002 355/53 |
| 2010/0022166 A1 * | 1/2010 | Kimba | ............. | B24B 9/065 451/5 |
| 2011/0135872 A1 * | 6/2011 | May | ............. | B32B 41/00 428/98 |
| 2011/0290421 A1 * | 12/2011 | Santos Gomez | ...... | G01B 11/14 156/360 |
| 2012/0147175 A1 * | 6/2012 | Kawaguchi | ............. | B29C 70/386 348/88 |

FOREIGN PATENT DOCUMENTS

| | | | | |
|---|---|---|---|---|
| FR | 2 949 378 | | 3/2011 | |
| WO | WO 2010100571 A1 * | 9/2010 | ......... | G01B 11/0608 |
| WO | WO 2011/116191 A1 | 9/2011 | | |

* cited by examiner

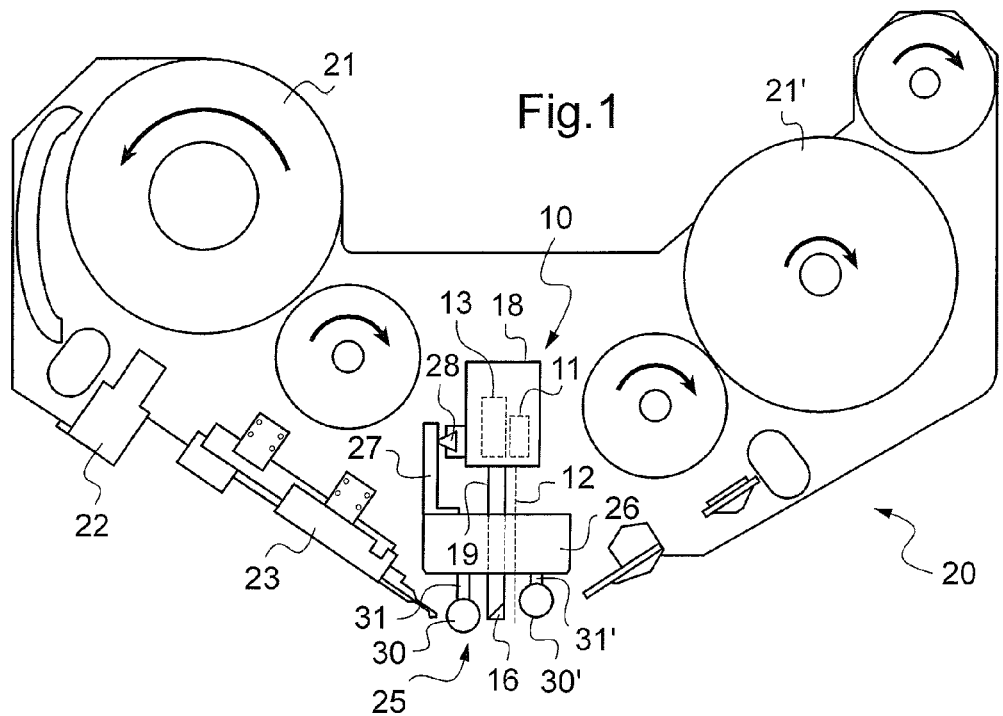
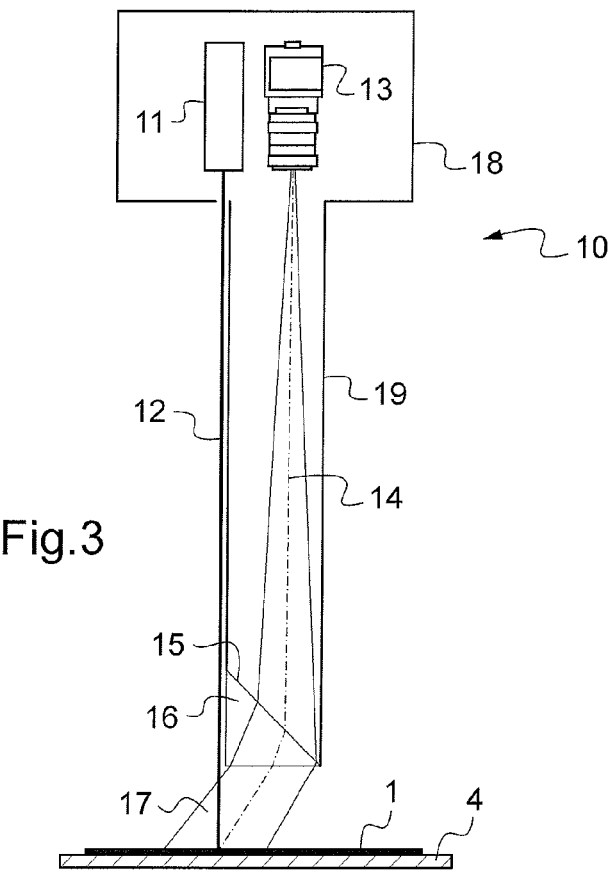

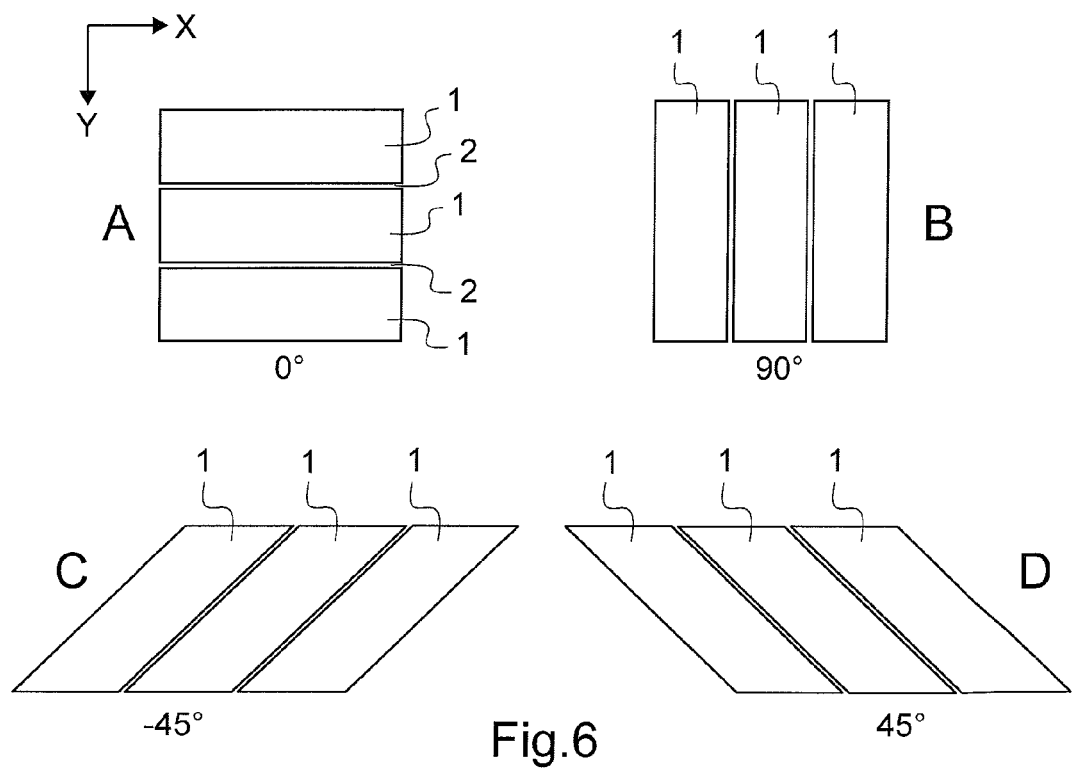
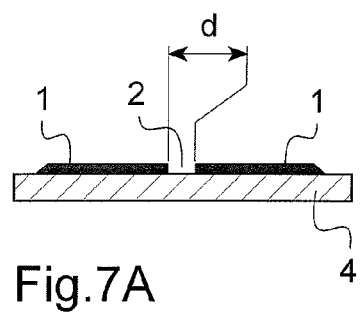
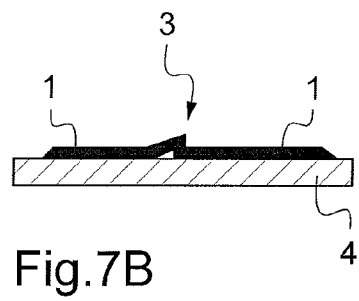
Fig.6
Fig.7A    Fig.7B

METHOD FOR CHECKING THE PLAY BETWEEN STRIPS DEPOSITED BY A DRAPE-FORMING HEAD, AND SUB-ASSEMBLY OF A DRAPE-FORMING HEAD WITH AN ONBOARD CHECKING DEVICE

CROSS REFERENCE TO RELATED APPLICATIONS

The present application is a 35 U.S.C. § 371 National Phase conversion of PCT/FR2012/050990, filed May 3, 2012, which claims benefit of French Application No. 1154774, filed May 31, 2011 and French Application No. 1155228, filed Jun. 15, 2011, the disclosure of which is incorporated herein by reference. The PCT International Application was published in the French language.

TECHNICAL FIELD OF THE INVENTION

The present invention relates to the manufacture of composite components using strips laid up by a draping head and, more particularly, to how to check the quality of this layup, notably by checking the clearances between the strips.

BACKGROUND OF THE INVENTION

In order to manufacture various components such as airplane wings, it is known practice, for example from document U.S. Pat. No. 4,842,684 in the name of the Applicant Company, to use a robot or a machine fitted with a draping head to lay automatically onto a layup tool or mold a composite tape made of elements of fiber (carbon, glass, an aramid resin for use in the fabrication of synthetic fibers sold under the trademark KEVLAR®, etc.) which are stuck together by impregnating with a thermosetting resin (the elements are then generally supported on a backing tape made of paper or plastic film) or a thermoplastic resin. The composite tape is paid out from a reel to pass over the draping head where the tape of prepreg fibers is detached from the backing tape, the latter being returned to a winding mandrel, while the prepreg is applied to the mold or to the previous layers already laid up, by a compaction member generally consisting of a roller or an applicator shoe connected to the draping head. Suitable members guide the prepreg to the layup zone, downstream of the strip circuit, and separate the prepreg from its backing as close as possible to the layup member. The draping head is mounted with an ability to move along several axes (generally five axes or six axes) so as to conform to the increasingly complex shapes of the components that have to be produced using this technique. This head moves at very high speed, for example at 1 m/s.

Bearing in mind the shapes of the components produced, and notably of their edges, it is necessary not only to lay up what is known as "full width" lengths of tape, with four sides, but also lengths of various shapes, obtained by complex cutting-out of the tape.

For through-cuts of simple shapes, use is made of a single-phase layup process which involves the in situ cutting of the strips that are to be laid up and immediately laying them using the same machine. A mechanical or ultrasonic knife cuts the prepreg tape directly on its backing paper without cutting through this paper which will then be wound back onto the mandrel after peeling.

For complex shapes of strip to be cut out, use is made of a two-phase process whereby the cutting is done upstream in the process, using a specialized first machine, and whereby the successive precut portions are left on the initial backing tape or placed between two protectors and wound onto a cassette which is then installed on the draping head.

Whether it is the single-phase process or the two-phase process that is used, a draping head is used for laying up the prepreg tapes and this head may be a single or double head: the latter comprises two strip-laying circuits which downstream end in a layup zone at the bottom end of the head. Documents FR2888156, FR2894510 and FR2949378 in the name of the Applicant Company disclose exemplary embodiments of such double draping heads, generally with two compacting members, in this instance rollers, one per circuit, which may be of different widths. These two rollers are generally very close together, leaving only a narrow space between them, typically a space of under two centimeters.

It is important constantly to check the quality of the laying-up of the strip laid by the draping head and notably to verify that the various portions of strip do not overlap but, on the other hand, do actually have the requisite clearance between them.

This checking can be done purely visually, using measuring magnifying glasses. However, it is very difficult because the strips of carbon are black and the clearances do not show up well; the components to be examined may be very big and large, forcing the operator tasked with making the visual inspection to climb up onto the components with the risk of damaging them; and finally, the number of clearances to be checked is extremely large because there may for example be 10,000 complex strips to check in one component.

It is therefore desirable to find a method and a device for checking the clearance automatically.

Attempts have been made at checking the clearances using suitable illumination of the surface and observation thereof using a camera the images (contrasts) of which are analyzed, but experience has shown that the results are of low reliability, this not exceeding 70%.

Moreover, it has been found that the variations in distance between the camera and the surface to be observed can lead to difficulties in focusing the checking camera entailing corrections for the measured height, taking this distance into consideration.

Furthermore, the ideal location at which to perform the check, right in the region of the two compacting rollers in the case of a double draping head, is very tight and does not leave a lot of space in which to install inspection equipment.

Document US 2007/271064 discloses a draping subassembly.

Document US 2007/229805 discloses a checking device included within a draping head.

However, a device and a method that improve the reliability of the existing systems and that are suited to being installed in a tight space within the draping device have yet to be found.

It is therefore an object of the invention to provide a method and an on-board device for checking the clearances between strips or, more generally, for checking the surface of the laid strips, which overcome these difficulties.

SUMMARY OF THE INVENTION

The invention achieves its objective by virtue of a subassembly of a draping head for laying onto a layup tool a strip of prepreg brought to the subassembly, the subassembly comprising, downstream, at least one layup member and at least one compacting member for the prepreg strip, and a device for checking the surface of the strip and notably the clearance between strips, this device being a profilometry device which comprises a laser light source that shines a line of light onto the surface to be checked and a camera for capturing the image of the line of light that has been shone, characterized in that the device comprises a prism situated near the surface to be checked along the axis of the camera so as to return to the camera the image of the shone line of light that reaches it at a certain angle.

Two-dimensional profilometry methods using laser triangulation are known per se and are often used in various fields of industry such as described for example in documents U.S. Pat. No. 6,621,060 and U.S. Pat. No. 7,423,734. They involve shining a laser line onto a surface and analyzing the image of this line using a camera generally positioned obliquely with respect to the laser beam. The Keyence company also markets two-dimensional profilometers in the form of compact units but those cannot be positioned in the layup zone downstream of the layup head, given its specific geometry and the very small amount of space available in this layup zone. The invention makes it possible to overcome this difficulty by using a prism near the surface to be checked, in the layup zone, this prism allowing the image to be conveyed at an angle toward the camera; the latter can then be positioned freely and notably be situated remotely with the light source and the rest of the device at a less confined point on the draping head.

As a result, in the preferred version of the invention, the camera and the laser light source are housed side by side in a remote unit located at a distance very much above the compacting member or members, the prism being connected to the unit and to the camera by an elongate casing positioned vertically near the compacting member or members. The expression "very much" above the compacting members means that they are not only above the compacting members themselves, such as the compacting rollers, but are also above the system that supports and drives them, allowing them to move freely up and down.

When the invention is applied to a double draping head with two compacting members, the elongate casing is advantageously positioned in the space between the two compacting members.

Advantageously, the checking device comprises two unit and prism assemblies intended to frame the two edges of a laid strip.

Advantageously, the two unit and prism assemblies are mounted with an adjustable separation in order to adapt to the width of laid strip.

The invention also relates to a method for checking the inter-strip clearance there is between two strips of prepreg laid up by a subassembly of a draping head for laying up on a layup tool a strip of prepreg brought to the subassembly, the subassembly comprising, downstream, at least one layup member and at least one compacting member for the prepreg strip, the method for checking the inter-strip clearance using a profilometry method, namely a line of light is shone onto the surface to be checked, and the image of this line of light is observed by a camera, characterized in that the image is returned at a certain angle to a prism positioned near the surface to be checked and is then returned onto the axis of the camera.

The invention allows the use of equipment that is relatively conventional and robust, particularly in the case of the camera which does not need to be a micro camera or a pencil camera.

The method of the invention is advantageously implemented after a prior step of discerning the ridges (due to an overlap) of the edges of the strip. What happens is that the profile of an edge of the strip (or an end of a strip) is similar to an overlapping profile and it is useful for the program to include the location of the edges of the strip so that it does not confuse them with ridges.

The automatic profile detection method according to the invention can be used first of all in a preventive context to memorize the checks and use them to optimize the programming of the draping head and then, once the suitable programming has been effected, in a curative context to raise alarms after the surface of each layer has been checked and a fault has been noticed. The programming software defines which regions are to be checked by taking account of the tapes already laid.

Naturally, the invention can be used not only for checking the clearance between strips but also for checking other aspects that can be detected by profilometry, such as the ends of the tape (end of ply) or layer contours.

BRIEF DESCRIPTION OF THE DRAWINGS

Other features and advantages of the invention will emerge from the following description of one exemplary embodiment. Reference will be made to the attached drawings in which:

FIG. 1 is a schematic front view of a double draping head incorporating the measurement device according to the invention.

FIG. 3 is a schematic front view illustrating the principle of measuring using the device of the invention.

FIG. 6 depicts four conventional arrangements of carbon strips viewed from above.

FIGS. 7A and 7B are schematic depictions from the side of two carbon strips laid in situations in which they have clearance between them and in which they overlap, respectively.

DESCRIPTION OF PREFERRED EMBODIMENTS

Figure 2:
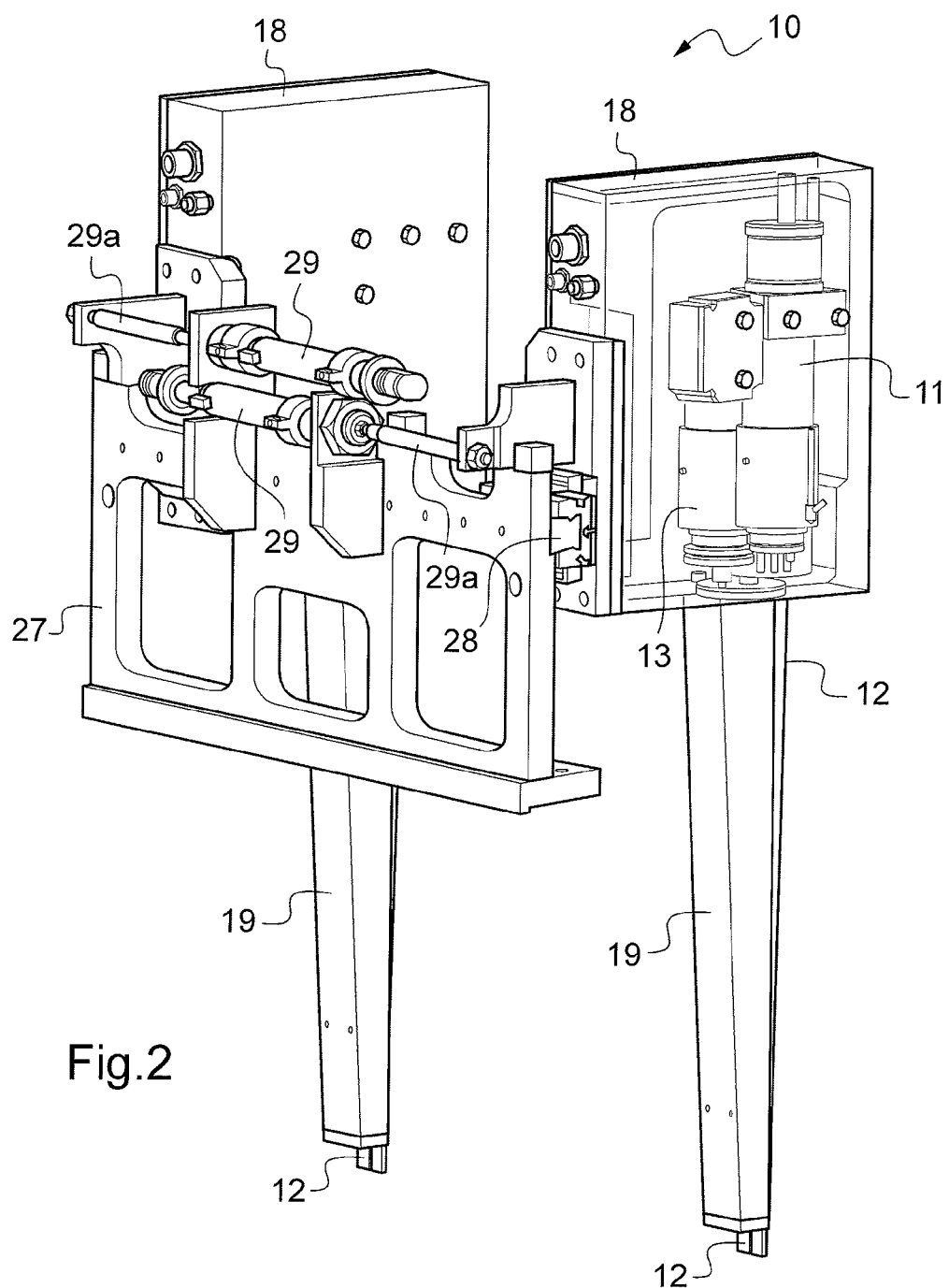
FIG. 2 is a perspective view of the measurement device of the invention, in isolation from the draping head.

To begin with, reference is made to FIGS. 6, 7A and 7B which illustrate schemes for laying composite strips 1 of coated carbon fibers. A component is made up of a layup, on a layup tool 4, of layers formed of laid strips. To give the product isotropic properties, these layers have various orientations, for example respectively at 0°, 90°, −45° and +45°, and are laid up alternatively by the draping head. As can be seen, a strip 1 is placed next to an adjacent layer 1 leaving a certain clearance 2, of value d which is commonly between 0 and 2.5 mm. This clearance needs to be conformed to and checked and any form of overlap 3 as depicted in FIG. 7B is to be avoided.

Draping the layers upon one another may lead to localized gradients, of less than 10%, on the profile constructed. These gradients and the difference in surface levels mean that the observation that may be made of them along a vertical axis (assuming that the laid-up surface is placed on a horizontal support) is corrupted by errors: the actual surface observed may be a few millimeters forward of or to the rear of the theoretical surface observed and falsify the measurement. This is why the method and the device of the invention favor observing the surface that is to be observed obliquely, the surface being illuminated by a laser beam normal to the surface of the tooling 4. The principle behind this is illustrated in FIG. 3.

The checking device 10 comprises a lighting device or laser light source 11 which sends a collimated beam of light 12 vertically onto the surface of the strip 1 laid on the horizontal tooling 4 (or on to several layers already laid up on this tooling 4). The laser source 11 is near a camera of vertical axis 14 parallel and adjacent to the beam 12. The camera 13 can thus see the oblique face 15 of a right prism 16 which receives the rays 17 reflected off the surface of the strip 1, after they have been refracted in the prism 16. The light source 11 and the camera 13 are placed inside a unit 18 and an elongate casing 19 of appropriate height is placed under the unit 18 to support the prism 16 at its end and protect the observed image. This prism 16 measures, for example, 10 mm wide across its horizontal face, and deflects the image by 27°. The collimated lighting 12 can be achieved by laser LEDs which provide greater precision than a conventional laser source. The elongate casing 19 also has approximately this 10 mm dimension widthwise, allowing it to fit between the rollers of a double draping machine, the rollers of which are closely spaced. This therefore allows the entire checking device, except for the prism and its casing, to be "raised up" above the rollers, to a protected and more spacious zone so that the structure that will now be described with reference to FIGS. 1, 2, 4A, 4B, 5A, 5B can be obtained. The prism 16 by contrast remains easily accessible for cleaning or changing.

FIG. 1 schematically shows the device 10 on board a double layup head 20 used for a single-phase or two-phase layup process. This head 20 is intended to be mounted, with the ability to move along various axes (5 or even 6 axes), at the bottom of a beam suspended from a gantry able to move over the layup tooling. The composite strip is paid out from one or the other of the cassettes 21 or 21' and arrives, passing through work stations for cutting 22, possibly for heating, and various guiding and layup members 23, at the bottom most downstream section of the head, the layup station 25 itself which notably comprises two compacting rollers 30, 30' mounted via retractable rods 31, 31' on a roller support and control assembly 26. The rollers 30, 30' are for example 60 mm in diameter and 300 mm and 150 mm long respectively. They can be retracted in a height-wise direction over a travel of 25 mm. The space left horizontally between the surfaces of the rollers 30, 30' is, for example, 14 mm; FIGS. 1, 4A, 4B, 5A, 5B are not drawn to scale and the space between the rollers 30, 30' has been exaggerated for clarity of representation. In point of fact, the casing 19 of the checking device 10 can be fed through this space so that its prism 16 enters the layup zone 25 between the rollers 30, 30'. The unit 18 containing the light source 11 and the camera 13 is, for its part, situated above the rollers. The unit 18 is fixed for example to the assembly 26 that supports the rollers 30, 30', using a bracket 27.

FIG. 2 shows the mounting of the checking device 10 on the bracket 27 in greater detail. On the one hand, the checking device 10 is double and comprises two units 18 each one containing their light source 11 which emits a beam 12, and their camera 13 positioned over the elongate casing 19. Each unit 18 is mounted with the ability to slide horizontally on the vertical wall of the bracket 27 by virtue of guideways 28. The horizontal movement of the units 18 on their guideways 28 is obtained using horizontal actuators 29 fixed to the bracket 27 and of which the rod 29a is connected to a respective unit 18.

Figure 4A:
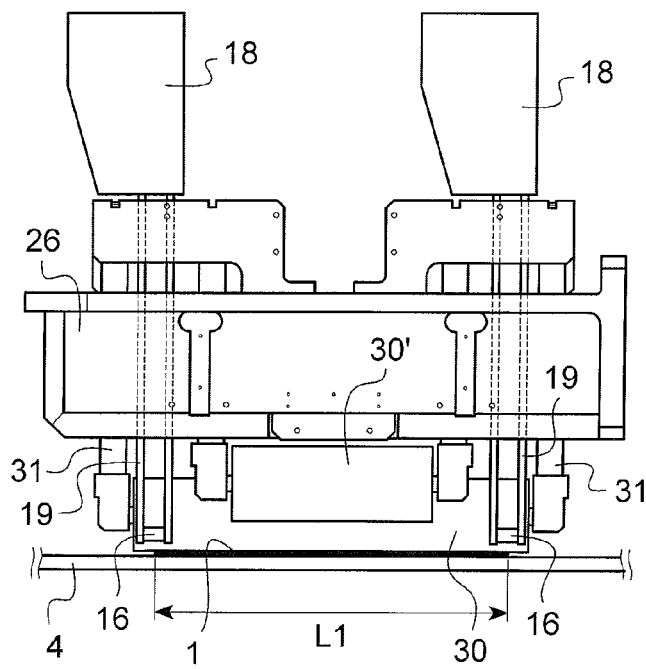
FIGS. 4A and 4B are schematic front and side perspective views of the bottom of the double draping head with the device of the invention, with the compacting rollers in a first position and with a first separation of the two parts of the device.
Figure 4B:
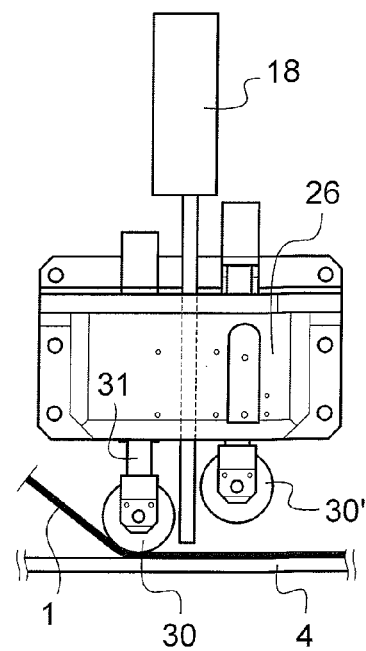
Figure 5A:
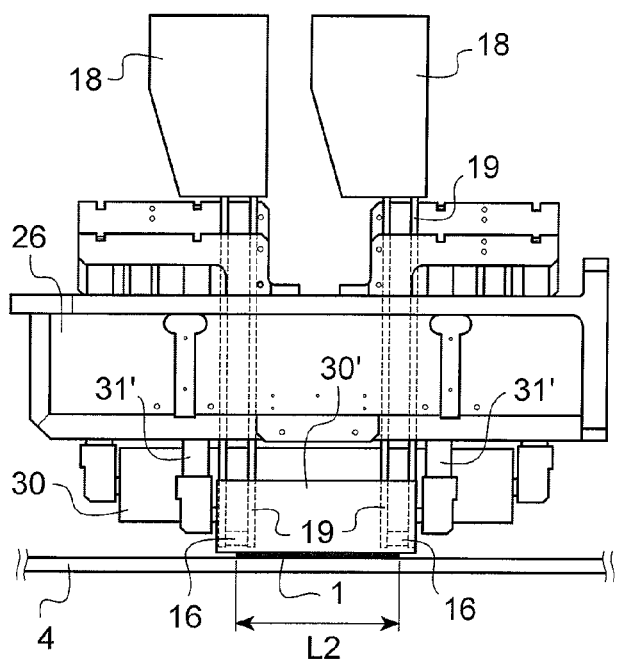
FIGS. 5A and 5B are schematic front and side perspective views of the bottom of the double draping head with the device of the invention, with the compacting rollers in a second position and with a second separation of the two parts of the device.
Figure 5B:
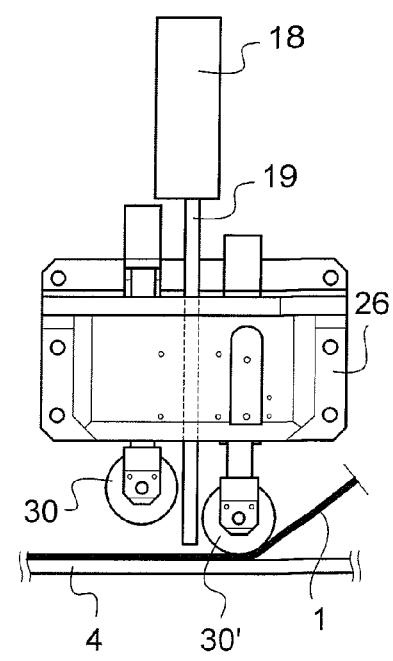

As FIGS. 4A, 4B, 5A, 5B show, the two units 18 of the checking device 10 may adopt configurations:
- of maximum separation, in FIGS. 4A, 4B, with a separation L1 for example of 300 mm (or around 12 inches) for checking the clearances at the edges of 300 mm wide strips, or
- of minimum separation, in FIGS. 5A, 5B, with a separation L2 for example of 150 mm (or around 6 inches) for checking the clearances at the edges of 150 mm wide strips.

Thanks to the on-board checking device according to the invention, a great many measurements per second, for example 10 to 100 measurements per second, can be taken and processed by a suitable computer connected to the controller controlling the draping head, so that the quality of the laying-up of the layers can thus be checked.

What is claimed is:

1. A subassembly of a draping head for laying onto a layup tool a strip of prepreg brought to the subassembly, the subassembly comprising, downstream, at least one layup member and at least one compacting member for the prepreg strip, and a device for which is configured to check a surface of the strip, the device which is configured to check the surface of the strip being a profilometry device which comprises at least one unit, the at least one unit comprising at least one laser light source that shines a line of light onto the surface to be checked and at least one camera for capturing the image of the line of light that has been shone, wherein the device which is configured to check the surface of the strip comprises at least one prism situated near the surface to be checked along the axis of the camera so as to return to the camera the image of the shone line of light that reaches it at a certain angle;
    wherein the at least one unit is two units, the at least one laser light source is two laser light sources, the at least one camera is two cameras, and the at least one prism is two prisms; and
    wherein a first unit of the two units and a first prism of the two prisms form a first assembly, a second unit of the two units and a second prism of the two prisms form a second assembly, and the first assembly and the second assembly are mounted with an adjustable separation between the first assembly and the second assembly.

2. The subassembly as claimed in claim 1, wherein the two cameras and the two laser light sources are housed side by side in the two units which are located at a distance above the at least one compacting member, the two prisms being connected to the two units and to the two cameras by an elongate casing positioned vertically near the at least one compacting member.

3. The subassembly as claimed in claim 2, wherein the draping head is a double head, the at least one compacting member is two compacting members, and the elongate casing is positioned in a space between the two compacting members.

4. A profilometry method for checking the inter-strip clearance between two strips of prepreg laid up by the subassembly of a draping head as claimed in claim 1, the profilometry method comprising the steps of:

shining a line of light from at least one laser light source onto a surface to be checked; and observing an image of the line of light by a camera, wherein the image is returned at a certain angle to a prism positioned near the surface to be checked and is then returned by the prism directly onto the axis of the camera.

5. The subassembly as claimed in claim 1, wherein the device which is configured to check the surface of the strip is further configured to check a clearance or play between strips.

\* \* \* \* \*